R. S. McINTYRE.
COMPRESSED AIR WATER ELEVATOR.
APPLICATION FILED SEPT. 4, 1912.
1,093,871.
Patented Apr. 21, 1914.
2 SHEETS—SHEET 1.
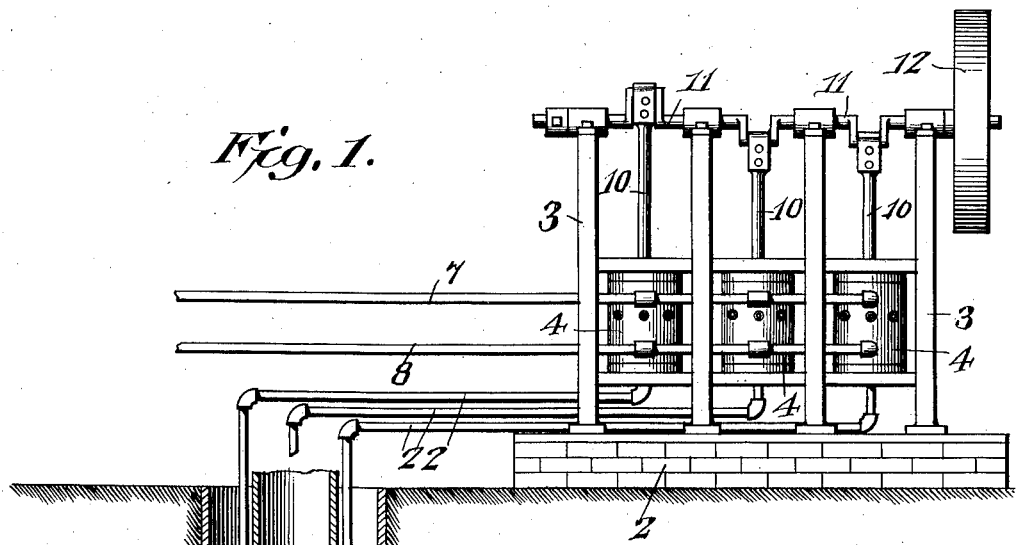
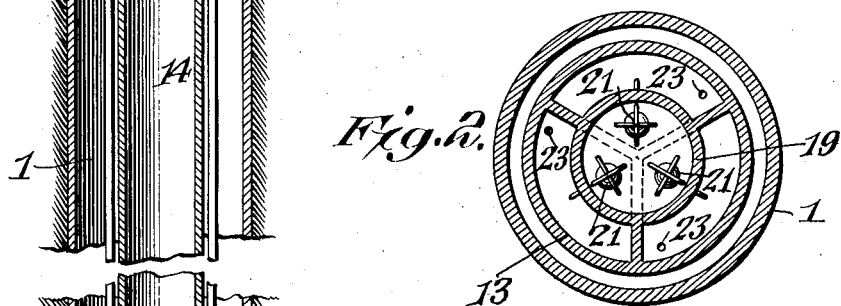
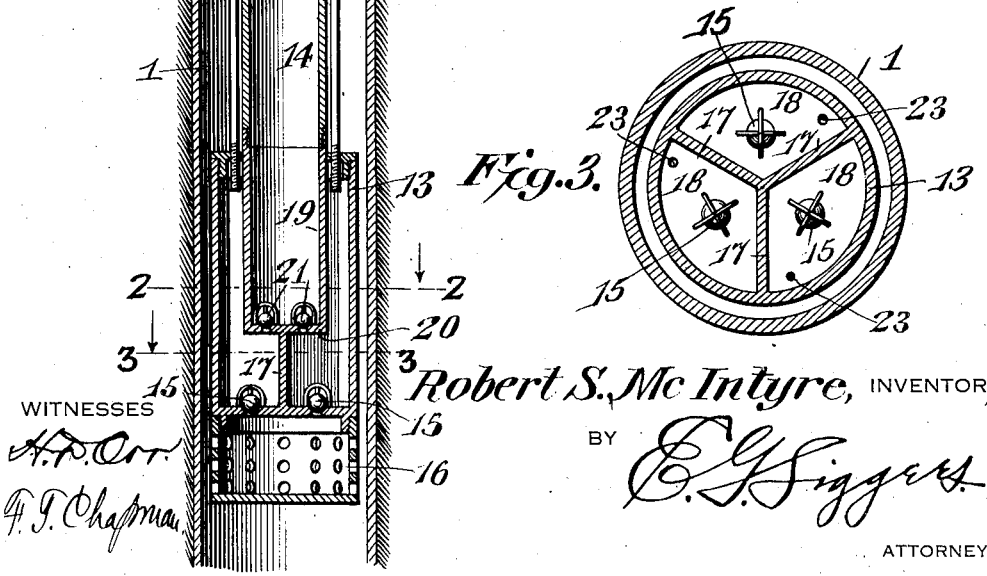
Robert S. McIntyre, INVENTOR,
WITNESSES
BY
ATTORNEY

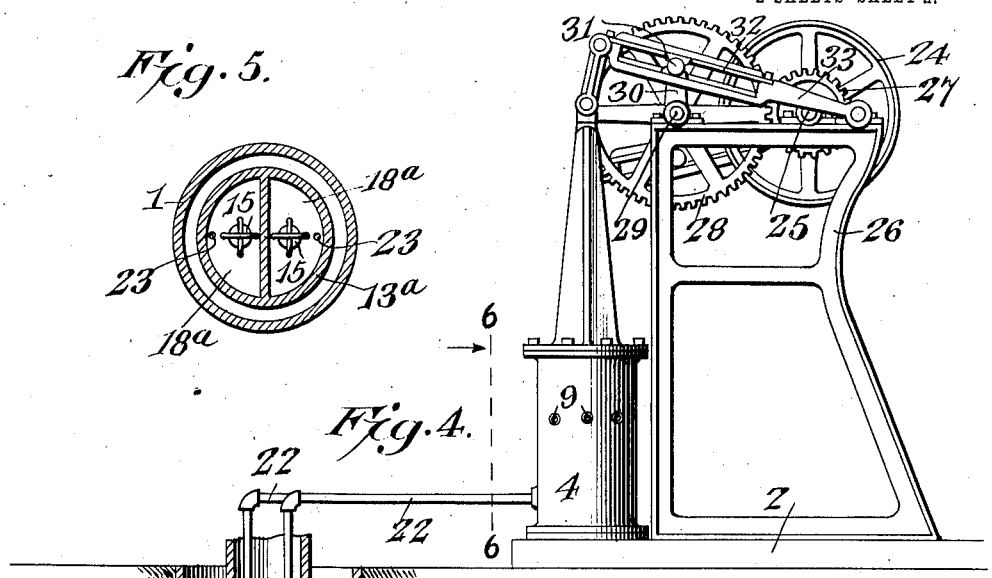

UNITED STATES PATENT OFFICE.

ROBERT SAFFORD McINTYRE, OF RIVERSIDE, CALIFORNIA.

COMPRESSED-AIR WATER-ELEVATOR.

1,093,871. Specification of Letters Patent. Patented Apr. 21, 1914.

Continuation of application Serial No. 656,671, filed October 25, 1911. This application filed September 4, 1912. Serial No. 718,529.

*To all whom it may concern:*

Be it known that I, ROBERT S. MCINTYRE, a citizen of the United States, residing at Riverside, in the county of Riverside and State of California, have invented a new and useful Compressed-Air Water-Elevator, of which the following is a specification.

This invention has reference to improvements in compressed air water elevators, and its object is to provide a water elevator in which compressed air is utilized as the motive means for causing the water to be lifted, and wherein there is no such progressive flow of air to cause the elevation of the water as is usual in compressed air water elevators.

The invention is designed to be used in connection with wells or other bodies of water from which the water is to be raised, the invention being particularly adapted for use in connection with wells especially where simplicity of structure and efficiency of operation is demanded because of the conditions to be met.

In accordance with the present invention there is provided an air actuator connected by suitable pipes or conduits to cylinders immersed in the water, whereby air is alternately compressed and expanded in a manner to first drive out any water which may be in the cylinder or cylinders beneath the surface of the water, and to then cause an inflow of water into the cylinders to be again expelled, and so on. There are no valves whatsoever in the device acting to alternately compress and rarefy the air and the only valves employed are check valves in the water cylinder or cylinders. The water is therefore always expelled in one direction from the pump cylinder or cylinders and never back into the body of water, except that there is provided in each cylinder a balancing hole or passage of relatively small size.

In order to provide for a steady flow of water it is desirable that the device be double or triple acting and, therefore, there are provided two or three water cylinders or chambers and two or three devices for alternately compressing and rarefying the air, although this does not preclude the use of a single set or more than three sets.

A single set of devices comprises an air cylinder with a piston therein and means for reciprocating the latter, the cylinder being open at one end so far as the flow of air is concerned and at the other end is closed except that it is freely connected with a small air conduit or pipe in turn leading to and freely connected to one end of a cylinder or chamber immersed in the water to be elevated, the capacity of the last named cylinder or chamber being much in excess of that of the small air pipe or conduit. The cylinder in the water, which may for convenience be called simply a water cylinder, is provided with an inflow check valve and an outflow check valve and also a small balancing perforation or passage in the bottom portion. The invention also contemplates the employment of a quick stroke and slow return mechanism for driving the piston in the air cylinder.

The invention will be best understood from a consideration of the following detailed description, taken in connection with the accompanying drawings forming a part of this specification, with the further understanding that while the drawings show a practical form of the invention, the latter is susceptible of various changes and modifications so long as the salient features of the invention are retained and the end sought is obtained.

In the drawings:—Figure 1 is a view partly in elevation and partly in vertical section of an installation embodying the present invention. Fig. 2 is a section on the line 2—2 of Fig. 1. Fig. 3 is a section on the line 3—3 of Fig. 1. Fig. 4 is a view similar to Fig. 1 but illustrating a lesser number of air pumps and water cylinders and a different type of drive for the air pump. Fig. 5 is a section on the line 5—5 of Fig. 4. Fig. 6 is a section on the line 6—6 of Fig. 4 and omitting distant parts. Fig. 7 is a vertical section through one of the air pumps with the piston shown in elevation.

In the drawings, Figs. 1 and 4, there is shown a well 1 which is assumed to contain a suitable quantity of water. While the present invention will be considered as installed in a well, it will be understood that the installation may be in connection with any body of water from which water is to be elevated.

The invention is particularly useful on farms or under other conditions where the apparatus must be operated by unskilled labor, and where it may be even necessary to install the apparatus by the help of unskilled labor.

The wells shown in the drawings may be considered as ordinary drilled wells of six or more inches in diameter and of appropriate depth, although no attempt is made in the drawings to show any particular proportions.

At the surface of the ground a suitable foundation 2 is built and upon this foundation, which may be of brick or cement or wood, there is erected in the structure shown in Fig. 1 a framework 3 carrying air cylinders 4, one of which is shown more in detail in Fig. 7. This air cylinder is provided with a cooling jacket 5 and with a piston 6, which latter is of the valveless type and may simulate the trunk piston of an explosion engine. The water jacket of each cylinder is connected to pipes 7, 8, by which cooling fluids may enter the water jackets and escape therefrom. At an appropriate point in the air cylinder there are ports 9 which are uncovered for an instant on the suction stroke of the piston, this being the upstroke in the particular arrangement shown, since the pistons are indicated as being mounted in the upright position, but it will be understood that the cylinders may be otherwise mounted. Each piston is connected by a pitman 10 to an appropriate crank of a crank shaft 11 having bearings in the frame 3, and at one end carrying a band pulley 12 by means of which the shaft may be driven. This band pulley is to be understood as symbolizing any suitable power means for rotating the shaft 11. In the particular structure shown in Fig. 1 three air cylinders are indicated, and these are all connected to a single shaft with a displacement of the cranks of one hundred and twenty degrees, so that the action of the air pumps is practically continuous.

At an appropriate depth in the well 1 there is lodged a cylinder 13 having an outlet pipe 14. In the particular showing of the drawings the cylinder is in fact a multi-cylinder and so far as action is concerned each compartment of the cylinder might be a separate cylinder, but for compactness and steadiness of operation the multi-cylinder construction is to be preferred without, however, any limitation of the invention thereto. The bottom portion of the cylinder is provided with a check valve 15 for each compartment of the cylinder. These check valves open to the entrance of water into the cylinder, but prevent the escape of water from the cylinder through them. Below these check valves the cylinder may be provided with a strainer 16 as is customary. The interior of the cylinder is provided with an appropriate number of longitudinal webs 17 dividing it into compartments 18 which in the particular instance are three in number, and these webs at an appropriate point in the height of the cylinder may emerge into a pipe 19 to which the pipe 14 is connected. The pipe 19 is provided with a bottom member 20 having a check valve 21 for each compartment 18, and these check valves open into the pipe 19 and close against passage of water from the pipe 19 into any one of the compartments 18 of the multi-cylinder. By this means water may be drawn into any compartment 18 from the well through the check valve 15, and then discharged into the pipes 19 and 14 through the appropriate one of the check valves 21, and by timing the operation a continuous stream of water may be forced into the pipe 14 and ultimately out of the well through the top thereof, the pipe 14 leading to the surface of the ground and to a suitable point of disposal.

Each air cylinder 4 is connected at one end to a pipe 22 of relatively small diameter, and each pipe 22 leads to a respective chamber 18 of the cylinder 13. The total capacity of each pipe 22 is considerably less than the capacity of a compartment 18 or the corresponding air cylinder 4. Each compartment 18 communicates with the interior of the well through the bottom of the cylinder 13 by means of a small perforation 23 which may be termed a balancing perforation and to which reference will hereinafter be made.

In general arrangement the structure of Fig. 4 is similar to that of Fig. 1, except that there is a water cylinder 13ª having but two compartments 18ª and two check valves 15 one for each compartment, as well as a balancing perforation 23 for each compartment. The air pipes 22 in Fig. 1 are exterior to the pipe 14 and enter the respective compartments 18 through the upper head of the cylinder 18, while in the structure shown in Fig. 4 the air pipes 22 are carried into the well through the pipe 14 and ultimately into the pipe 19 and enter the respective chambers 18ª through said pipe 19.

In Fig. 1 the air pump pistons are driven by a triple crank shaft, while in the structure of Fig. 4 there is provided a quick stroke and slow return movement for each air pump piston. In this structure there is a drive pulley 24 mounted on a drive shaft 25 journaled in a frame 26 and this drive shaft carries a gear pinion 27 meshing with a gear wheel 28 mounted on the shaft 29 journaled in the frame 26. The shaft 29 carries cranks 30 each provided with a slidable bearing 31 in elongated guideways 32 on rock arms 33 each journaled at one end on the frame 26. The other end of each rock arm 33 is connected to a piston rod 35 which in turn is connected to the piston within the cylinder 4. This arrangement of driving gearing provides for a relatively quick movement of the piston in one direction and a slow movement of the piston in the other.

Let it be assumed that the air pump pistons are reciprocating then on the movement of an air pump piston in the appropriate direction, this being an upward movement in the particular structure shown, the air in the pump cylinder 4, the pipe 22 connected thereto and the chamber 18 to which the pipe 22 communicates is rarefied, the stroke of the piston being what may be termed the suction stroke and as there are no valves in the pump 4 or pipe 22, the air is at once rarefied throughout the connected parts. This means that the atmospheric pressure of the water in the well causes an inflow of water through the valve 15 into the appropriate chamber 18 or 18ª as the case may be. The suction stroke continues until just at the termination of the stroke the ports 9 are uncovered, so that the partial vacuum is to an extent relieved. Now the return or power stroke of the piston commences and the air in the cylinder 4, pipe 22 and chamber 18 or 18ª is compressed. The water finds no escape through the check valve 15 which is now closed, but may pass out through the chamber 18 through the check valve 21 into the pipe 19 and so into the pipe 14 and as the pump continues to act water is finally ejected from the pipe 14 above the surface of the ground at a point of disposal of the water being pumped. On the next suction stroke of the air pump the valve 21 closes and the valve 15 opens so that another volume of water is drawn into the chamber 18 or 18ª and on the succeeding stroke of the pump this new body of water is driven into the pipe 14.

Actual practice has demonstrated that the presence of the balancing perforation 23 very materially improves the efficiency of the pump, but this perforation is of small area. A hole one-sixteenth of an inch in diameter proved to be correct to balance a pump having a lift of nearly sixty feet and delivering six gallons per minute. If it was desirable to double the amount of water delivered it would be necessary to provide a hole of twice the cross sectional area to get the same result. Should, however, it be desirable to pump twice the amount, or twelve gallons one hundred and twenty feet high, the hole would remain the same as at first, namely, one-sixteenth of an inch, since the pressure and the quantity then balance the same as when delivering six gallons on a sixty foot lift. It is found in practice that it is not advisable to increase the size of the hole to more than about three-eighths of an inch irrespective of the lift or the quantity of water being delivered.

Were it not for the ports 9 the pump would sooner or later become stalled due to the absorption of air by the water being pumped and practice has also demonstrated that atmospheric conditions have an effect upon the absorption of the air by the water. With, however, an inrush of air just at the completion of the suction stroke, the proper supply of air is maintained and a slight excess is not objectionable, since this will simply escape should the level of the water within the cylinder 13 or 13ª drop below the level of the valves 21.

The actuating means disclosed in Fig. 4 and which is equally adaptable to one, two, three or more air pumps provides for a slow suction stroke and a quick power or delivery stroke. On the suction stroke the pressure tending to cause the water to flow into the water cylinder can never equal atmospheric pressure, but will be somewhat under the same, while on the power stroke or that stroke which forces the water out of a cylinder, the pressure may reach any desirable amount within the capabilities of the apparatus, and the water may be forced out of the cylinder more rapidly than it will flow into the water cylinder. In this way the heavier pressure obtained by the quick pressure stroke permits the forcing of the water into the outlet pipe even though there be a considerable head of water therein, and this head may represent a far greater pressure than the available pressure causing the inflow of water into the cylinder. The quick power stroke is therefore of especial value in connection with a pump of the character herein set forth.

It may be stated that in actual practice with the air pumps or cylinders and the water cylinder or cylinders proportioned to cause the pumping of several gallons per minute, the air pipe or pipes may be as small as quarter inch pipes, this size being given simply as an illustration and without confining the invention to it, but showing the relatively very small diameter of the air pipes.

The present application is a continuation of my application No. 656,671, for compressed air water elevator filed October 25, 1911.

What is claimed is:—

1. A water elevating apparatus comprising a cylinder with inlet and outlet valves and adapted to be immersed in the water to be elevated, an air cylinder, a reciprocatory piston in the air cylinder, and an air conduit of relatively small capacity connecting one end of the air cylinder to the water cylinder, the air cylinder being void of valves and having ports between its interior and exterior at that end only of the stroke of the piston remote from the end of the air cylinder connected to the water cylinder, and the water cylinder being provided with a balancing passage between its interior and exterior.

2. A water elevating apparatus comprising a cylinder with inlet and outlet valves, the outlet valves being at a point intermediate of the ends of the cylinder with the inlet valves at one end of the cylinder, said cylinder being adapted to be immersed in the water to be elevated, an air cylinder, an air conduit of relatively small bore connecting one end of the air cylinder to that end of the water cylinder remote from the inlet valve, and a reciprocatory piston in the air cylinder, said air cylinder and piston being void of valves, and the air cylinder having ports between the interior and exterior at that end only of the stroke of the piston remote from the end of the air cylinder connected to the water cylinder, and said water cylinder having at the water inlet end a free passage between the interior and exterior.

3. A water elevating apparatus comprising a water receiving compartment adapted to be immersed in the water to be elevated and provided with inlet and discharge valves and with a freely open passage between the interior and exterior of the compartments, an air duct of relatively small size connected to the water compartment at the end remote from the inlet valve, a valveless air pump provided with a reciprocatory piston and with an unobstructed air port extending from the interior to the exterior of the pump and uncovered by the piston for communication of the interior of the pump with the atmosphere at the limit of the stroke of the piston away from the air conduit connection, and means for actuating the piston rapidly in one direction and slowly in the other direction.

4. A water elevating apparatus comprising a cylinder adapted to be immersed in the water to be elevated and having inlet and outlet valves and also having a balancing passage between its interior and exterior, a valveless air pump provided with a reciprocatory piston, an air duct leading from the pump to the water cylinder in free communication with both and of relatively small size, and means for actuating the piston of the air pump slowly in one direction and rapidly in the other direction.

5. A water elevating apparatus comprising a cylinder adapted to be immersed in the water to be elevated and provided with inlet and outlet valves and also provided with a balancing passage between its interior and exterior, an air duct of relatively small bore connected to the end of the water cylinder remote from the inlet valve, an air cylinder connected at one end to the air duct in free communication therewith, a reciprocatory piston in the air cylinder, both the piston and air cylinder being void of valves, and means for actuating the piston slowly on the suction stroke and rapidly on the compression stroke.

6. A water elevating apparatus comprising a cylinder adapted to be immersed in the water to be elevated and provided with inlet and outlet valves, an air duct of relatively small bore connected to the end of the water cylinder remote from the inlet valve, an air cylinder connected at one end to the air duct in free communication therewith, a reciprocatory piston in the air cylinder, both the piston and air cylinder being void of valves, and means for reciprocating the piston slowly on the suction stroke and rapidly on the compression stroke, the water cylinder being provided with a freely open passage between its interior and exterior at the end provided with the inlet valve.

7. A water elevating apparatus comprising a multi-compartment member with each compartment provided with inlet and outlet valves, the inlet valve of each compartment being at one end thereof and the outlet valve being located intermediate of the ends of the compartment, and the compartment having also a free passage of relatively small area through the end provided with the inlet valve, an air duct of relatively small cross sectional area connected to each compartment at the end thereof remote from the inlet valve, and a multi-cylinder air pump having as many cylinders as there are water compartments with one end of each cylinder freely connected to the corresponding end of the air duct individual thereto, a reciprocatory piston in each air cylinder, both the cylinder and piston being void of valves, and the cylinder being provided with free means of communication between its exterior and interior at the limit of movement of the piston away from the air duct, and means for reciprocating the pistons in dephased relation.

8. A water elevating apparatus comprising a multi-compartment member with each compartment provided with inlet and outlet valves, the inlet valve of each compartment being at one end thereof and the outlet valve being located intermediate of the ends of the compartment, and the compartment having also a free passage of relatively small area through the end provided with the inlet valve, an air duct of relatively small cross sectional area connected to each compartment at the end thereof remote from the inlet valve, and a multi-cylinder air pump having as many cylinders as there are water compartments with one end of each cylinder freely connected to the corresponding end of the air duct individual thereto, a reciprocatory piston in each air cylinder, both the cylinder and piston being void of valves, and the cylinder being provided with free means of communication between its exterior and interior at the limit of movement of the piston away from the air duct, and means for reciprocating the pistons in dephased relation, said last named means being constructed to impart a relatively slow movement to each piston away from the air duct connection and a relatively rapid movement toward such air duct connection.

In testimony, that I claim the foregoing as my own, I have hereto affixed my signature in the presence of two witnesses.

ROBERT SAFFORD McINTYRE.

Witnesses:
 LAFAYETTE GILL,
 MABEL PARKIN.